July 25, 1961 G. E. HORNSBY 2,993,979
HEATED BABY CARRIAGE BLANKET
Filed March 3, 1959
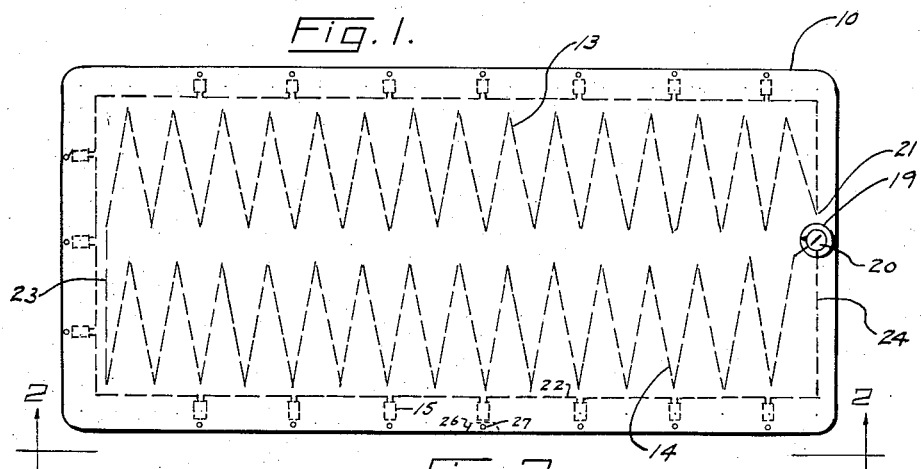
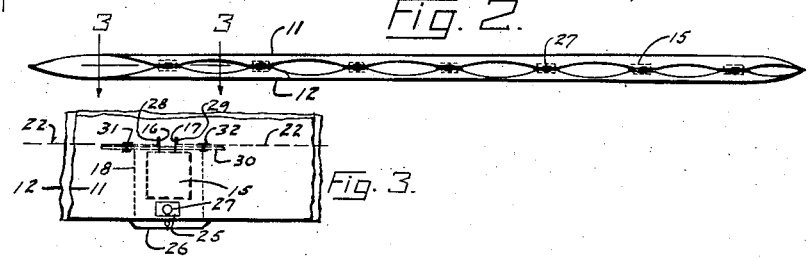
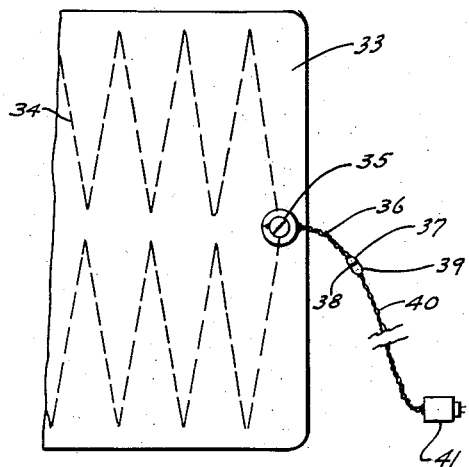
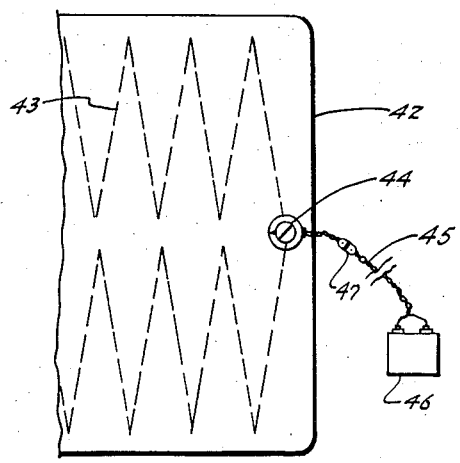
INVENTOR.
GUYTON ELLIS HORNSBY
BY *Victor J. Evans & Co.*
ATTORNEYS United States Patent Office 2,993,979
Patented July 25, 1961

2,993,979
HEATED BABY CARRIAGE BLANKET
Guyton Ellis Hornsby, 234 N. Thomas St., Arlington, Va.
Filed Mar. 3, 1959, Ser. No. 796,846
1 Claim. (Cl. 219—46)

This invention relates to electrically heated blankets, quilts, or other bed, crib, or carriage covering elements, and in particular, a blanket or other cover for a baby carriage or crib in which electric heating elements incorporated in the body thereof are supplied with electric current embedded in the body of the elements or positioned in individual pockets extended around the edges of the elements and in which the parts are connected through a switch and timer to prevent the electric current being accidently left on indefinitely.

The purpose of this invention is to provide an electrically heated cover for use in portable vehicles, such as baby carriages, where it is inconvenient to provide cords extended to a source of electric current and also inconvenient to attach relatively large storage batteries to the vehicle.

Various types of electric blankets, electrically heated garments, and other similar elements have been provided, however, for use in a baby carriage it is difficult to use conventional storage batteries of sufficient size to provide current for electric heating elements and it is also substantially impossible to connect the heating element to a source of current supply.

With this thought in mind this invention contemplates an electric baby carriage or crib blanket having electric heating elements incorporated therein and also having relatively small electric batteries extended continuously around edges of the blanket and connected to the heating elements through a switch and timer whereby the complete blanket is self contained and may be used with or without heat.

The object of this invetnion is, therefore, to provide an electric blanket that is particularly designed for use in a crib or baby carriage where connections to a source of electric current are inconvenient.

Another object of the invention is to provide an electrically heated cover in which electric heating elements incorporated therein are supplied with current by batteries also incorporated in the cover.

Another object of the invention is to provide an electrically heated cover in which electric heating elements therein are supplied with electric current by batteries also incorporated therein in which timing means is provided for disconnecting the elements from the batteries.

A further object of the invention is to provide an electrically heated blanket or other cover in which electric heating elements therein are supplied with current by batteries in the blanket or cover in which the blanket or cover is of a simple and economical construction.

With these and other objects and advantages in view the invention embodies a rectangular-shaped body of flexible material having electric heating elements, batteries, and connecting wires positioned between layers of flexible material in which the electric heating elements are connected to the bateries through a switch and timer.

Other features and advantages of the invention will appear from the following description taken in connection with the drawing, wherein:

FIGURE 1 is a plan view of the electrically heated blanket or cover with electric heating elements, batteries, and wires incorporated therein shown in broken lines.

FIGURE 2 is a side elevational view of the electrically heated cover or blanket.

FIGURE 3 is a sectional plan through an edge of the blanket or cover showing a battery positioned in a pocket in one side of the cover with terminals of the battery inserted in sockets in the cover and from which wires extend.

FIGURE 4 is a view similar to that shown in FIGURE 1 showing an end of a blanket or cover and illustrating a modification wherein the cover is provided with a conventional electric cord with a plug on the extended end.

FIGURE 5 is a view, also similar to that shown in FIGURE 1 showing an end of a cover with a cord extended from one end thereof connected to a storage battery.

Referring now to the drawing wherein like reference characters denote corresponding parts the improved electrically heated blanket or cover of this invention includes a body 10 of flexible material having layers 11 and 12 secured together at the edges by heat sealing, stitching, or the like, with electric heating elements 13 and 14 positioned between the layers of material, with batteries 15 having terminals 16 and 17 positioned in pockets 18 extended continuously around the blanket and in which the electric heating elements are connected to the batteries through a timer 19 and a manually actuated switch 20.

One terminal 21 of the electric heating element 13 is connected to the batteries 15 by a wire 22 and the opposite terminal of the element 13 is connected to the element 14 by a wire 23. The opposite terminal of the element 14 is connected to a terminal of the timer 19 and the opposite terminal of the timer 19 is connected to one terminal of the switch 20, the opposite terminal of the switch 20 being connected to the batteries 15 by a wire 24.

The pockets 18 are positioned between the layers 11 and 12 of the material forming the blanket and the outer ends of the pockets are closed with flaps 25 attached to the edges of the sheets of material at the points 26 and the flaps are retained in closed positions by snaps 27. The terminals 16 and 17 are positioned in sockets 28 and 29 in a contact bar 30 having terminals 31 and 32 to which ends of the wire 22 are connected, as shown in FIGURE 3.

Both the switch 20 and timer 19 may be conventional and both elements may be connected in the circuit by conventional means.

In the design illustrated in FIGURE 4 a blanket or other cover 33 is provided with a heating element 34 and the ends of the heating element are connected to a conventional timer and switch 35 from which an electric cord 36 extends, the cord being connected to one section 37 of a connector 38, the opposite section 39 of which is connected to a cord 40 that extends to a conventional plug 41 by which the cord may be plugged into a light socket or other means for supplying electric current.

In the design illustrated in FIGURE 5 a cover 42 is provided with an electric heating element 43 and the element 43 is connected to a conventional switch and timer 44 from which a cord 45 extends and the cord may extend to terminals of a storage battery 46. The cord 45 may also be provided with a connector 47.

Although the electrically heated blanket or cover of this invention is described as being particularly adapted for baby carriages, cribs, and the like, it will be understood that it may also be used for other purposes and may be provided in different patterns and designs.

The blanket as illustrated in FIGURES 1 and 2 is substantially the same as a conventional blanket and may be used without turning on the heat elements in the conventional manner. When it is desired to supply heat the timer may be set to a predetermined time period and the switch turned on whereby current may be supplied to the heating elements in regular time intervals to prevent unnecessary load on the batteries.

It will be understood that the batteries may be of any suitable shape or design and other means may be used for incorporating the batteries in the blanket or cover.

It will be understood that other modifications, within the scope of the appended claim, may be made in the design and arrangement of the parts without departing from the spirit of the invention.

What is claimed is:

In an electric blanket, the combination which comprises a substantially rectangular-shaped body of flexible material having spaced pockets with sockets therein extended continuously around the edges thereof, batteries positioned in the pockets with terminals thereof extended into the sockets of the pockets, flaps providing closures for the pockets secured to the body at one of the sides of the pockets, fastening means for securing the flaps to the body at the opposite sides of the pockets, a timer positioned in the body, a switch also positioned in the body, electric heating elements incorporated in the body, and means connecting the electric heating elements to the terminals of the batteries in the pockets through the timer and switch.

References Cited in the file of this patent

UNITED STATES PATENTS

| | | |
|---|---|---|
| 1,375,863 | Stanton | Apr. 26, 1921 |
| 1,558,278 | Phillips | Oct. 20, 1925 |
| 2,148,661 | Thierer | Feb. 28, 1939 |
| 2,203,918 | Moberg | June 11, 1940 |
| 2,342,744 | McCready | Feb. 29, 1944 |
| 2,692,326 | Crowell | Oct. 19, 1954 |
| 2,697,775 | Licht | Dec. 21, 1954 |
| 2,798,896 | Bly | July 9, 1957 |